Jan. 23, 1923.

E. CHAUSSARD.
ALTIMETER.
FILED SEPT. 5, 1922.

1,443,005.

Inventor:
Ernest Chaussard
By Mauro, Cameron, Lewis & Kerkam
attorneys.

Patented Jan. 23, 1923.

1,443,005

UNITED STATES PATENT OFFICE.

ERNEST CHAUSSARD, OF PARIS, FRANCE, ASSIGNOR TO SOCIÉTÉ D'OSTIQUE ET DE MECANIQUE DE HAUTE PRÉCISION, OF PARIS, FRANCE, A LIMITED JOINT STOCK COMPANY OF FRANCE.

ALTIMETER.

Application filed September 5, 1922. Serial No. 586,350.

*To all whom it may concern:*

Be it known that I, ERNEST CHAUSSARD, a citizen of the Republic of France, resident of Paris, France, have invented new and useful Improvements in and relating to Altimeters; for which I have made application in France on August 11, 1921, and which is fully set forth in the following specification.

This invention has for its object an altimeter, i. e. an instrument which has for its object to determine the height of a visible object above the horizontal plane sighted by an observer.

The objects of this invention will best be understood by reference to the following description and accompanying drawings, in which:—

Fig. 2 is a diagrammatic side elevation of a known apparatus of the type herein referred to;

Figure 1:
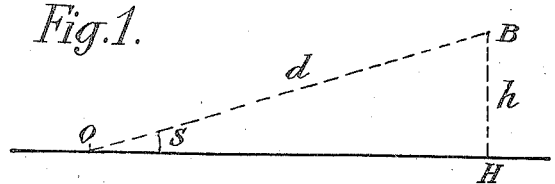
Fig. 1 is a diagram illustrating the principle on which the invention is based.

Referring to the diagram shown in Fig. 1 O is an observation station, B a visible object, S an angle of elevation of the sighted object, $d$ the distance, O—B, and $h$ the height to be determined, the formula which solves this problem is:—

$$h = d \sin S.$$

There are apparatuses solving the above problem, which are used in combination with a telemeter, the latter apparatus being capable of giving at once the distance $d$ and the angle of elevation $S$.

The said known apparatuses allow of geometrically constructing and of reading $h$ by the derived formula $$\frac{1}{h} = \frac{\frac{1}{d}}{\sin S},$$

by means of an arrangement of sliding rules and linked bars.

Figure 2:
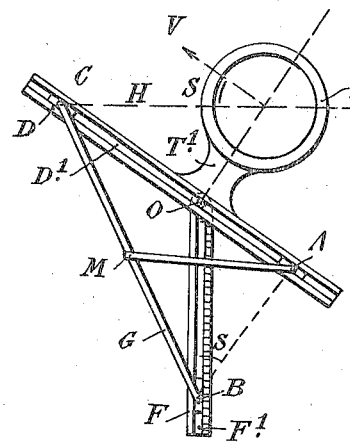

Fig. 2 shows diagrammatically in elevation a known apparatus of this type. In this figure, T shows a monostatic telemeter of any known type integral with the support $T^1$ of a rule D, the whole being capable of pivoting around a horizontal axis O upon a vertical support F acting as a graduated scale. The rule or bar D is in a horizontal position when the horizon is sighted with the telemeter.

Two blocks A and C can slide in a guide $D^1$ provided along the axis of the rule D. The sliding block A is mechanically connected to the inner mechanism of the telemeter in such a manner, which is old and well known in the art, as to be displaced proportionally to $\frac{1}{d}$ that is to the reciprocal of the distance $d$ of the object, measured by the said telemeter.

The sliding block C is loosely guided in a guide $D^1$ which is linked to a rod G, linked in its turn at its other end to a block B which is capable of sliding in a guide $F^1$ provided in the rule F.

A rod M A is linked to the middle point M of the rod G, which rod M A has a length equal to M—C and M—B and is linked at its other end to the sliding block A.

It follows from the above arrangement that the line joining B to A is constantly at a right angle with the rule D.

It follows that the angle O B A is, at any moment, equal to the angle of elevation S of the sighted object and that the distance O B measured on the vertical rule F, is at any moment proportional to $\frac{1}{h}$ since in the triangle O B A $$\frac{1}{h} = \frac{\frac{1}{d}}{\sin S}.$$

The above known arrangement has a serious drawback: the telemeter T rotates around an axis O which is situated on its outside; therefore, an overhung portion is formed which should be avoided when the size of the telemeter reaches approximately one and a half meters in length, for instance.

The present invention does away with the above drawback.

To this end the plane of the bars and rules which give $$\frac{1}{h} = \frac{\frac{1}{d}}{\sin S}$$

instead of being at a right angle with the axis of the telemeter, is arranged parallelly to the latter.

Figure 3:
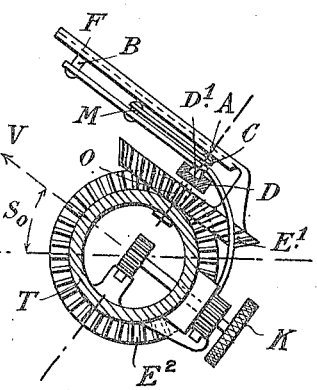
Fig. 3 is a sectional elevation on the line 3—3 of Fig. 4, illustrating one embodiment of the present invention.
Figure 4:
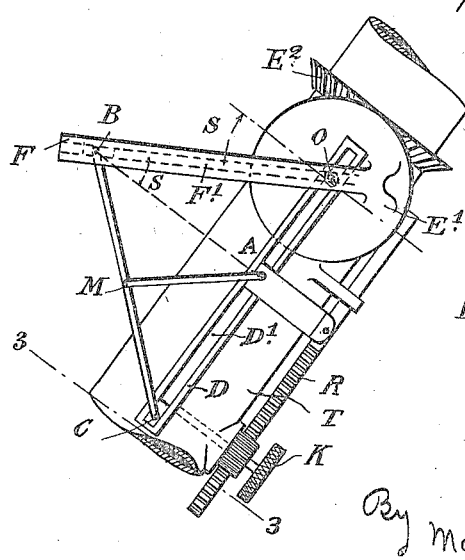
Fig. 4 is a top plan view of the parts shown in Fig. 3, portions of the telemeter being broken away.

Referring to Figs. 3 and 4, the latter being a projection upon a plane parallel to the plane of sight $c$—$V$, the known members referred to in the description of Fig. 2, are designated by the same letters as above.

The angle of rotation $S_0$ of the telemeter is reproduced at $S$ in a plane which is parallel to the plane of sight by means of two conical pinions equal in size: $E^2$ which is kept fixed in space and which may be loosely mounted upon the telemeter $T$, and $E^1$ which is loosely mounted about an axis $O$ integral with the telemeter.

The pinion $E^1$ carries the rule $F$ in which is displaced the sliding block $B$ whilst the rule $D$ in which are displaced the sliding blocks $A$ and $C$, is integral with the telemeter and is arranged parallel to the axis of the latter. Here also $OB$ is at any moment proportional to $\frac{1}{h}$.

Figs. 3 and 4 show that in the triangle $OAB$ of which the angle $OAB$ is at any moment a right angle, $$OB = \frac{OA}{\sin S}.$$

Therefore, in order to be able to read the height of the objective at any moment at $B$ on the rule $F$, $OB$ should be graduated so as to give $\frac{1}{h}$ and $OA$ so as to give $\frac{1}{d}$ obtained by connecting the sliding block $A$ with the deviating members $K$, $R$, etc. of the telemeter which supplies movements which are functions of $\frac{1}{d}$.

In the said combination of a telemeter with an altimeter, it is clear that the rotation of the telemeter being always exclusively effected around the axis of the telemeter, the drawback of the known arrangement mentioned above, is done away with.

Moreover the altimeter may remain constantly integral with the telemeter, and when taken to pieces it may be folded along the latter.

Having now particularly described and ascertained the nature of my said invention and in what manner the same is to be performed, I declare that what I claim is:—

1. A combined altimeter and telemeter comprising a bar secured to said telemeter parallel to the longitudinal axis thereof, a graduated rule pivoted to said bar, a link slidably engaging said bar at one end thereof and slidably connected at its opposite end to said rule, an arm slidably connected at one end thereof to said bar and pivotally connected at the opposite end thereof to said link midway of the length of the latter, said arm having a length equal to half the length of said link, means connecting the first-mentioned end of said arm to said telemeter in such a manner that the distance between said end of said arm and the pivot point of said rule is constantly proportional to the reciprocal of the distance of the object sighted, an annular gear member mounted concentric with the longitudinal axis of said telemeter, and means engaging said member for rotating said rule in proportion to the angular elevation of the sighted object.

2. An altimeter comprising, in combination with a telemeter, a bar secured to said telemeter parallel to the longitudinal axis thereof, a rule pivoted to said bar at one end thereof, a rod having sliding engagement at its opposite ends with said bar and rule, a link slidably connecting said rod to said bar, means connecting the sliding end of said link to said telemeter in such a manner that the distance between said end of said link and the pivot point of said rule is maintained proportional to the reciprocal of the distance of the object sighted, and means mounted concentric with the longitudinal axis of said telemeter for rotating said rule through an angle proportional to the angular elevation of the object sighted, said rule and rod being disposed in a plane substantially parallel to the longitudinal axis of said telemeter.

In testimony whereof I have signed this specification.

Dated this 4th day of August, 1922.

ERNEST CHAUSSARD.

Certificate of Correction.

It is hereby certified that the name of the assignee in Letters Patent No. 1,443,005, granted January 23, 1923, upon the application of Ernest Chaussard, of Paris, France, for an improvement in "Altimeters," was erroneously written and printed as "Société d'Ostique et de Mecanique de Haute Précision," whereas said name should have been written and printed as *Société d'Optique et de Mecanique de Haute Précision*, as shown by the records of assignments in this office; and that the said Letters Patent should be read with this correction therein that the same may conform to the record of the case in the Patent Office.

Signed and sealed this 27th day of February, A. D., 1923.

[SEAL.]
            KARL FENNING,
             *Acting Commissioner of Patents.*